US010823556B2

(12) United States Patent
Rodriguez (10) Patent No.: US 10,823,556 B2
(45) Date of Patent: Nov. 3, 2020

(54) POINT AND CLICK MEASURING AND DRAWING DEVICE AND METHOD

(71) Applicant: Luis Joaquin Rodriguez, South Orange, NJ (US)

(72) Inventor: Luis Joaquin Rodriguez, South Orange, NJ (US)

( * ) Notice: Subject to any disclaimer, the term of this patent is extended or adjusted under 35 U.S.C. 154(b) by 1042 days.

(21) Appl. No.: 14/245,859

(22) Filed: Apr. 4, 2014

(65) Prior Publication Data

US 2015/0285630 A1 Oct. 8, 2015
US 2016/0258746 A9 Sep. 8, 2016

Related U.S. Application Data

(60) Provisional application No. 61/861,051, filed on Aug. 1, 2013, provisional application No. 61/914,443, filed on Dec. 11, 2013.

(51) Int. Cl.
*G06F 3/02* (2006.01)
*G01B 21/28* (2006.01)
(Continued)

(52) U.S. Cl.
CPC .............. *G01B 21/28* (2013.01); *G01B 21/02* (2013.01); *G01B 21/16* (2013.01); *G01S 13/08* (2013.01);
(Continued)

(58) Field of Classification Search
CPC ........... G06F 3/017; G06F 2203/04807; G06F 9/4443; G09G 5/14; H04N 5/44591
(Continued)

(56) References Cited

U.S. PATENT DOCUMENTS 4,823,170 A * 4/1989 Hansen ................. G01S 17/875
356/620
5,175,616 A * 12/1992 Milgram ................ G03B 35/08
348/47
(Continued)

FOREIGN PATENT DOCUMENTS

WO WO-2013154217 A1 * 10/2013 ........... H04N 21/816

*Primary Examiner* — Charlie Y Peng (57) ABSTRACT

The invention is comprised of an assembly of hardware and software components for the purpose of measuring and drawing real life dimensions. With the present invention, an user defines a starting position in a spectrum of at least two coordinates. In a preferred embodiment all elements are integrated as one portable unit. The hardware elements comprise a point and click mechanism, whose operation is similar to a computer mouse, a display or viewing unit to act as a monitor, optional ways to input data, including but not limited to buttons and keys, and a way to power the device. The software element is generally defined by an application that allows tracing, drawing, measuring, calculating and saving data from real life physical areas by the interaction of the point-and-click mechanism, in optional combination with the ways to input data. The task is executed by the extrapolation of real life dimensions by successively selecting and clicking on defining points, resulting on a scaled down drawing recorded on the device and displayed on the viewing screen. Complex shape areas are calculated by segmenting them into regular geometrical shapes. Curvilinear and irregularly complex shapes are reticulated, so each reticle compartment's area is calculated and the entire shape area is calculated by the addition of all reticle's compartments for optimum precision and accuracy.

22 Claims, 12 Drawing Sheets

(51) Int. Cl.
  *G01B 21/02* (2006.01)
  *G01S 13/08* (2006.01)
  *G01S 15/08* (2006.01)
  *G01S 17/08* (2006.01)
  *G01B 21/16* (2006.01)
  *G06F 3/0484* (2013.01)
  *G06F 3/0488* (2013.01)
  *G06T 11/20* (2006.01)

(52) U.S. Cl.
  CPC ............. *G01S 15/08* (2013.01); *G01S 17/08* (2013.01); *G06F 3/02* (2013.01); *G06F 3/0488* (2013.01); *G06F 3/04847* (2013.01); *G06T 11/203* (2013.01); *G06T 2210/61* (2013.01)

(58) Field of Classification Search
  USPC .................................................. 715/863, 765
  See application file for complete search history.

(56) References Cited

U.S. PATENT DOCUMENTS

| | | | | |
|---|---|---|---|---|
| 5,926,168 A * | 7/1999 | Fan | ...................... | G06F 3/0325 345/158 |
| 6,452,606 B1 * | 9/2002 | Luzzatto | ................. | G06F 9/451 715/704 |
| 6,628,279 B1 * | 9/2003 | Schell | ................. | G06F 3/04845 345/420 |
| 7,086,162 B2 | 8/2006 | Tyroler | | |
| 7,609,249 B2 * | 10/2009 | Fouquet | ................ | G06F 3/0312 341/20 |
| 7,746,321 B2 * | 6/2010 | Banning | ................ | G03B 21/00 345/156 |
| 7,804,606 B2 | 9/2010 | Yu | | |
| 8,060,344 B2 * | 11/2011 | Stathis | ................ | G01C 15/002 348/135 |
| 9,383,895 B1 * | 7/2016 | Vinayak | .................. | G06F 3/017 |
| 2005/0091297 A1 * | 4/2005 | Sato | ...................... | G06F 3/0346 708/442 |
| 2005/0195157 A1 * | 9/2005 | Kramer | ............... | G06F 3/04845 345/156 |
| 2005/0270494 A1 * | 12/2005 | Banning | ................ | G03B 21/00 353/42 |
| 2009/0319237 A1 * | 12/2009 | Nishikawa | .............. | G06T 19/00 703/1 |
| 2010/0114537 A1 * | 5/2010 | Pershing | ................ | G06F 30/13 703/1 |
| 2011/0279445 A1 * | 11/2011 | Murphy | ................ | G06T 19/006 345/419 |
| 2011/0288816 A1 * | 11/2011 | Thierman | ............ | G01B 11/002 702/151 |
| 2011/0288818 A1 * | 11/2011 | Thierman | .............. | G01B 11/00 702/159 |
| 2012/0262365 A1 * | 10/2012 | Mallinson | ............... | G01S 1/725 345/156 |
| 2013/0021618 A1 * | 1/2013 | Trent | .................... | G01B 11/03 356/614 |
| 2013/0260824 A1 | 10/2013 | Chen | | |
| 2014/0300722 A1 * | 10/2014 | Garcia | .................... | G06F 7/602 348/77 |
| 2016/0196692 A1 * | 7/2016 | Kjallstrom | .......... | G06F 3/04815 345/633 |

* cited by examiner

POINT AND CLICK MEASURING AND DRAWING DEVICE AND METHOD

CROSS REFERENCE TO RELATED APPLICATIONS

This application claims the benefit of U.S. Provisional Application Ser. No. 61/861,051, filed Aug. 1, 2013, entitled "Point and Click Measurement and Drawing System" and 61/914,443, filed Dec. 11, 2013, entitled "Point and Click Measurement and Drawing System", by the present inventor and both of which are herein incorporated by reference.

FIELD OF THE DISCLOSURE

This invention relates to a Point-and-Click apparatus or assembly of components that conveniently allows the tracing and measuring of real life two dimensional areas into a scaled down electronic file that can be further shared, saved and edited.

BACKGROUND OF THE DISCLOSURE

Description of Prior Art

Measurement of dimensions has been a constant need in human civilization since the beginning of times. After the universal adoption of arabic numerals in the second millennium BC, the need to calculate and determine physical dimensions and sizes has always been a priority in society and human interactions.

Thus, different systems to calculate dimensions have been created in different cultures around the world, resulting in the two main standards that nowadays prevail in the calculation of length, width and height: The British System and the Metric System.

For many centuries, there were the original 'tape measures'. These 'tape measures' were replications of the established standards in the form of wood, paper, cloth or any other materials that allow the user to measure any item or any distance by laying these materials against the item, space or area being measured.

For some time, articulated wooden or metallic tape measures were used, with all the limitations that this system entails. Then, the retractable, roll up tape measure was introduced.

The ubiquitous retractable roll up tape measure became a standard around 1872 after U.S. Patent 5009 to A. J. Fellows was issued, and it remains a very popular item, despite the fact that in most cases, two persons are necessary to take measurements, and that measurements are limited to one at a time.

In late 20th and early 21st century, a number of high tech designs found their way into the marketplace. Like all the preceding attempts in history, these efforts were limited to measuring from point A to Point B, and giving only dimensions on a one by one instance pattern. None of these designs is apt to aid in drawing a two dimensional area.

Important examples include several optical, laser and ultrasonic distance one-dimensional systems, like products by the following manufacturers: LEICA, AGATEC, BOSCH, SICK, STANLEY, RYOBI, NORTHWEST INSTRUMENT, HILTI, DEWALT, CRAFTSMAN, JOHNSON, PREXISO, MILWAUKEE, etc., some with very high levels of precision of up to $1/16"$ within range of 230 ft, like the BOSCH Laser Distance Measurer GLR225, which claims t provide a total of 30,000 individual measurements with one single battery charge. But again, they are all limited to measuring only one dimension and unable to be adapted as a drawing tool.

Notable examples of patent documents include:

U.S. Pat. No. 7,086,162 to Dan Tyroler for a method and apparatus for distance measurement of two points relying on the angular calculations of two light beams projected from the apparatus at the two points whose distance is being measured. And that is precisely the main disadvantage of Tyroler with respect to the present invention: that it is limited to measure the distance between a maximum of two points. And it is, therefore impossible to use the apparatus to draw, trace and measure a two dimensional area.

U.S. Pat. No. 7,804,606 to Yin-Bo Y U et al, relates to a portable electronic measuring device and method to measure only the distance between two points. This patent also prevents the possibility of readily drawing and measuring a two dimensional area with the device.

US Patent Application 20130260824 to Chen refers to a mobile phone emitting signals to a first point and a second point so the distance between both points is calculated through a first distance measuring member and a second distance measuring member, plus an arithmetic module that calculates the distance between the readings of both distance measuring members.

Shortcomings of this Patent Application include the inability to measure more than two consecutive points and the inability to draw a two dimensional area.

As of to date, there is no measurement system that allows multiple readings of dimensions, much less readings of two-dimensional areas and even less, electronically tracing, drawing and calculations of two dimensional areas. No system allows the drawing and extrapolation of an existing area into a computer software application.

SUMMARY OF THE DISCLOSURE

In accordance with the present invention, an embodiment example of the device is powered by a battery or batteries, which may be rechargeable. This embodiment example comprises hardware and software.

Hardware includes a body, which further comprises point and click means, a monitor or display screen and other optional items, like for instance, keys, buttons, a tracking ball or a touch panel to act as a mouse.

Also, the screen may be touch sensitive to enable other features and tools, like keyboard, magnifying glass, scroll up, scroll down and scroll side-wise, etc.

Software is defined by a line or vector drawing application similar to CorelDraw™ or an architectural or technical tracing program. Some of these systems relate to two dimensional drawings and some relate to three dimensional drawings. Both of these scenarios are contemplated for this invention.

The device allows to selectively draw and measure one-dimensional lines and two-dimensional areas.

The pointing function is executed through at least one of several existing systems, Some of these systems are tangible, like a contraption similar to a mechanic tracking computer mouse or an optical computer mouse that is appended to an elongated member extending from the body of the invention. This elongated member may optionally be retractable, telescopic and/or removable.

Other systems are intangible, like, for instance: light beams, laser, waves, etc.

The following is a non-exhaustive list of media to act as the pointing means of the present invention:

Mechanical Tracking (including balls and wheels)
Optical Tracking,
Light Beams,
Laser Distance Measurers,
Ultrasonic Distance Measurers,
Global Positioning Systems,
Photogrammetry,
Triangulation,
Indoor Positioning Systems,
Electromagnetic Locators,
Earth's Magnetic Field,
High Frequency Radio Waves,
Point Finders,
Radar,
Surveying Total Stations.

Clicking on a first point and then on a second point, will produce a trace and measurement of a one dimensional line which is readily displayed on the screen.

For two dimensional drawings and measurements, a page of a predetermined size is defined for each job or document, in a manner similar to how it is done in drawing computer programs like CorelDraw™, Adobe Illustrator™ and architectural or technical drawing programs.

Optional margins are assigned to this page. An initial position of a cursor is assigned. Margins and position of cursor may be set as a default for subsequent jobs, or may be discretionarily changed, as desired.

Likewise, if a particular embodiment dictates margins and in a particular job, no margins are desired, the margins may be set to coincide with the edges of the document page, or a 'no margin' option may be provided.

Successive clicks on different points in a real world scenario will produce a two dimensional area, or multiple lines on a two dimensional plane, with their corresponding dimensions. In the context of this disclosure, the term 'real world scenario' refers to the palpable, tangible, three dimensional physical world, as opposed to the virtual world existing internally within other devices, assembly of devices or systems, and to which they refer to, and interact with.

If at one point the successive points must be discontinued, a escape key, double clicking, or similar means may be activated to interrupt the tracing. Then point-and-clicking may be resumed at another point as needed.

Irregular and complex shapes are electronically segmented by the device's software into geometrical shapes and appropriate formulas are applied to each of these steps to calculate their partial areas. A total area is obtained by the addition of all partial areas.

When irregular areas or irregular sections of an area are encountered, the software may provide approximations by 'rounding up' or 'rounding down' calculations.

Alternatively, the software may electronically microcompartmentalize an irregular area to a reticle of compartments of any predetermined size, including a pixel-like dimension or smaller, whereby a very accurate and precise area may be measured by calculating each compartment fully fitting within the perimeter of the traced area, and then, adding all compartments, regardless of complexities or irregularities of the general area.

Software commands may be embedded in a touch sensitive screen or may be enabled by ad-hoc keys on the device. These commands may vary in complexity and detail, but in a basic embodiment they may comprise 'Page Set Up', 'Open', 'Save', 'Save As', 'Undo', 'Redo', 'Preview', 'View', 'Escape', 'Print', 'Tools'.

The 'Tools' Command may further comprise the type of tracing tool to be used, like '2-point', 'Bezier', 'Freehand', etc.

A '2-Point' tool is used for one-dimensional tracing, from a first point to a second point.

A 'Bezier' tool is used to trace multiple consecutive points. When the sequence must be interrupted, a escape key may be depressed. Alternatively, double clicking or other system may be adopted to achieve this purpose.

A 'Freehand' tool is to trace curves and irregular shapes.

Then, it is also possible to discretionarily select the measuring system, e.g. Metric or British. This further enables switching from one system to another at any given time and thereby obtain any and all equivalences. It is also possible to ascertain the distance of two nodes by hovering the cursor over the line connecting them.

Other hardware and software features may further expand the possibilities of the invention. Thus, it is possible to have portable media ports, USB or other kind of connections to cooperate with a computer or other devices, camera, etc.

Likewise, it is possible to insert clip art items, stock photo, geometrical shapes, etc. through the drawing and measuring software.

Also, and within the scope of the invention it is possible to assign colors to different area and lines, edit the nodes or vectors that define the traced area, assign different thickness to lines as desired, alternatively use continuous lines or dotted lines, change fonts and styles, edit text, etc. In any event, editing can always be performed at a later time on a computer which has the software of the present invention installed, and which is part of the present description, and deemed to be proprietary.

It is to be understood that while the above described embodiment is given as an example, other substitutions and variations are possible within the scope of the invention. Also, it is possible to have the elements integrated as one unit, or to be made up of separate parts.

Additionally, there might be multiple embodiments of the invention with different levels of detail and complexity to suit particular and specific needs, markets, budgets and preferences.

Likewise, some embodiments may be enhanced by interacting with a tripod or other stabilizing means.

It is also to be understood that the defining elements of the present invention may be adapted to cooperate with existing hardware units like mobile phones and portable computers and so called tablets. In such cases, a pointing peripheral may be connected to the hardware and clicking may be performed from the device's touch screen, or ad-hoc tangible keys.

Other aspects of the invention will result obvious in light of the scope of the present description and the state of the art.

OBJECTS AND ADVANTAGES OF THIS INVENTION

The following are specific objects and advantages of the present invention:
1. To measure one dimensional lines, spaces and distances.
2. To trace and measure all lines in a two dimensional area.
3. To perform a rendering of a two dimensional area.
4. To calculate the total square area of a two dimensional shape.
5. To expand the limits and distances that can be measured.

6. To enable one single person to perform the above functions.
7. To accomplish the above functions with a light in weight portable device.
8. To eliminate the tedious and time consuming task of sketching by hand the area be measured and to then note one-by one all the dimensions in an area.
9. To eliminate the tedious and time consuming task of executing a final drawing of the area measured.
10. To enable the ability to compartmentalize a general irregularly shaped area into regular geometrical shapes, whereby the area of each geometrical shape is measured, and the total area is calculated by the addition of all the individual geometrical shapes' areas.
11. To enable the possibility to 'round up' and 'round down' any given measurement or distance.
12. To enable the possibility to reticulate or pixilate any curvilinear shape, so the area may be optimally calculated by the addition of all compartments or pixels within the boundaries of said curvilinear shape.
13. To minimize risks of error associated with manual measuring and drawing of an area.
14. To readily afford the possibility to save, replicate, share, transmit, publish and print the document created with the invention.
15. To further enable editing of the document created with the invention.
16. To instantly enable all the dimensions to be converted from one standard to another. e.g. from Metric to British, yards, picas, etc.
17. To enable different versions of a point and click measuring and drawing system to suit different applications, markets, budgets, preferences, etc.
18. To readily provide software compatible with the several computer systems and computer operating systems available for further editing and enhancing of the drawings achieved through the present invention.
19. As a result of all of the above, to achieve substantial savings of time and money.
20. As a result of all of the above, to optimize productivity.

BRIEF DESCRIPTION OF THE DRAWINGS

In the drawings, some closely related figures have the same number but different alphabetic suffixes.

FIG. 12b is a magnified detail of a portion of FIG. 12a.

REFERENCE NUMERALS

In the drawings, some reference numbers are appended by a letter to indicate a variation thereof. The following are the basic reference numerals without any appended letters.

20 Unit example of the invention
22 Body
24 Pointer (Pointing Means)
26 Monitoring screen
28 Keys or buttons
30 Clicker (Clicking means)
32 Handle
34 Traced line (One dimensional drawing)
36 Reading of measurement
38 Nodes
40 Two dimensional area
42 Section of two dimensional area
44 Section of two dimensional area
46 Section of two dimensional area
48 Section of two dimensional area
50 Section of two dimensional area
52 Perimeter of two dimensional area
54 Circled detail I
46 Coordinate assembly
58 Coordinate lines
60 Circled detail II
62 Compartment
64 Page of document/project
66 Margins
68 Cursor
70 Traced line (Two dimensional drawing)

DETAILED DESCRIPTION

Figure 1:
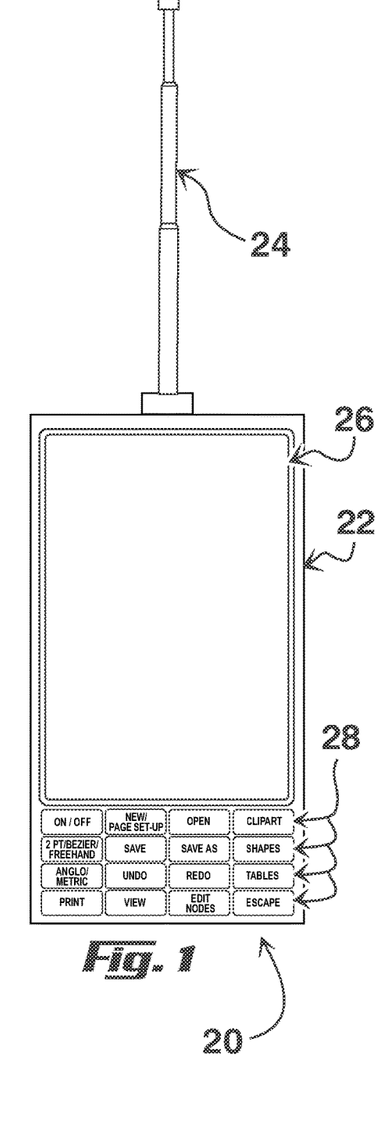
FIG. 1 is a plan view of an embodiment of the present invention.

FIG. 1 depicts an embodiment of the present invention 20, having a body 22, and projecting from such body a telescopic pointer 24 (point and click mechanism). Pointer 24 may alternatively be a fixed pole, may be removable or may be embodied as an intangible mechanism like for instance, light beams, sound waves or other type of signals.

The body further has a monitoring screen 26, and commanding keys 28.

Figures 2, 3:
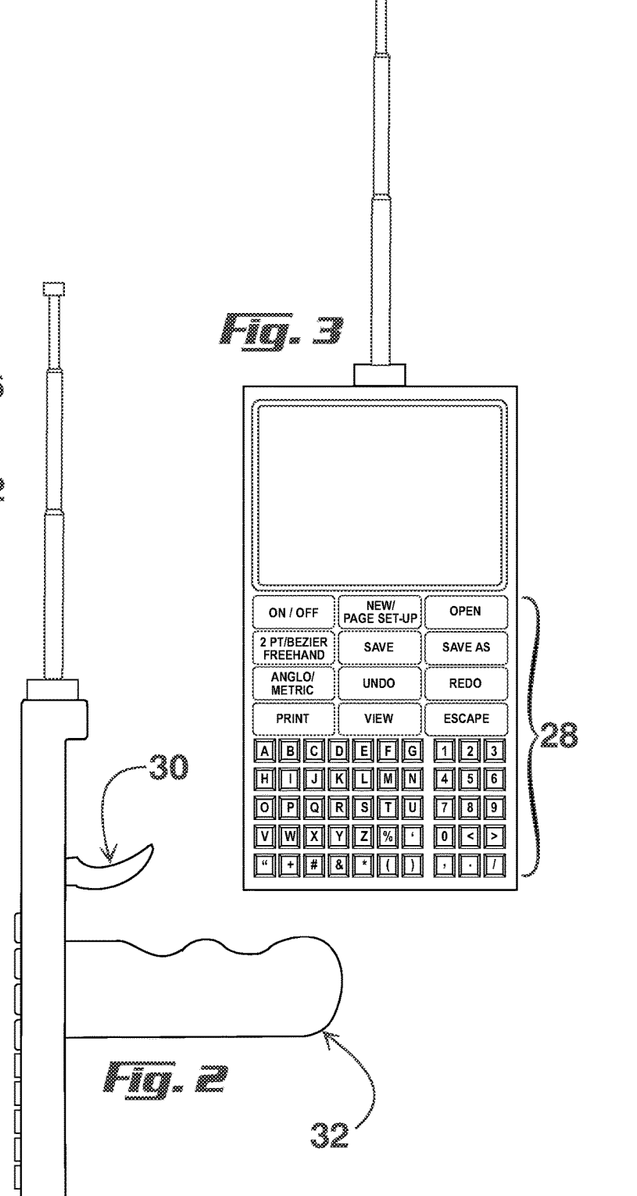
FIG. 2 is a side view of an embodiment of the present invention.
FIG. 3 is a plan view of another embodiment of the present invention.

A side view of the same embodiment is shown in FIG. 2, where a clicker 30 enables clicking of selected points and handle 32 aids in carrying and holding the device.

An alternate set of commanding keys 28 for this embodiment is shown in FIG. 3.

Figure 4:
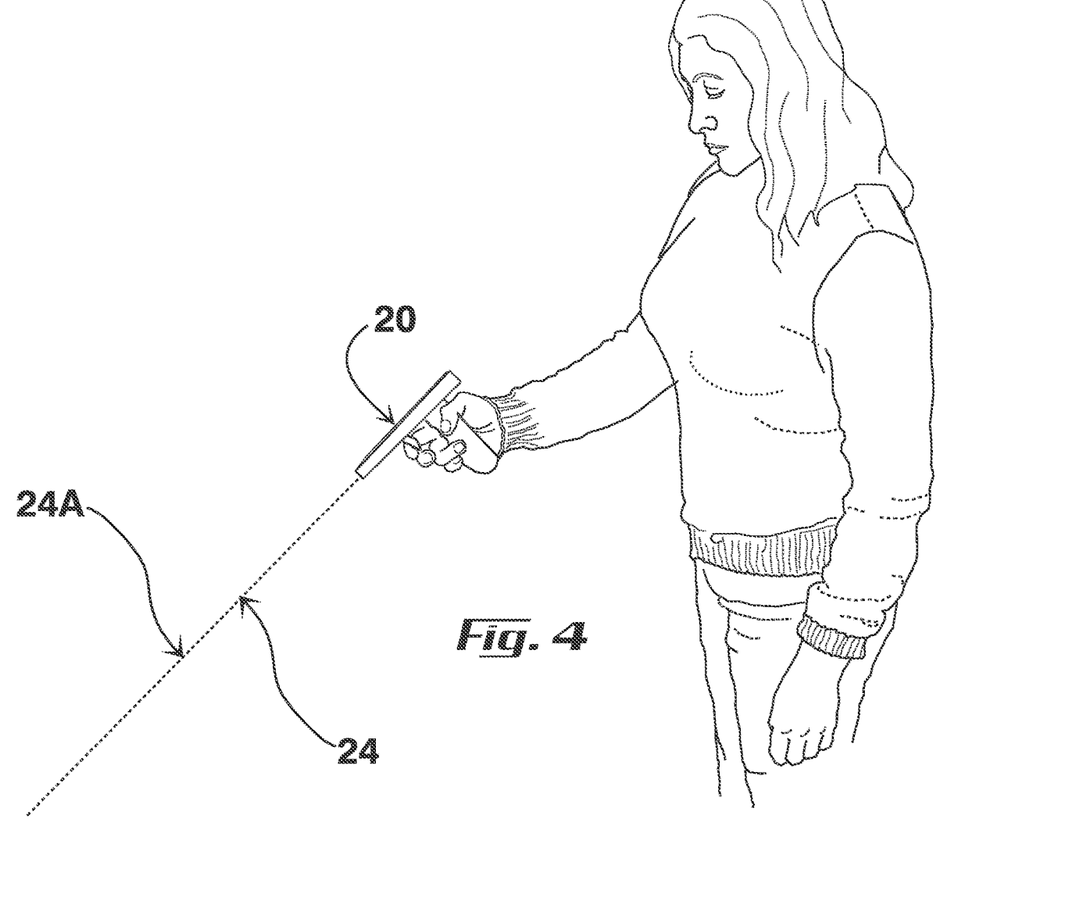
FIG. 4 Shows in perspective view a subject using an embodiment of the present invention.

FIG. 4 depicts a light or laser beam 24A acting as pointer 24 (Point and click mechanism or pointer), projecting from an embodiment of this invention 20, while being used.

Figure 5:
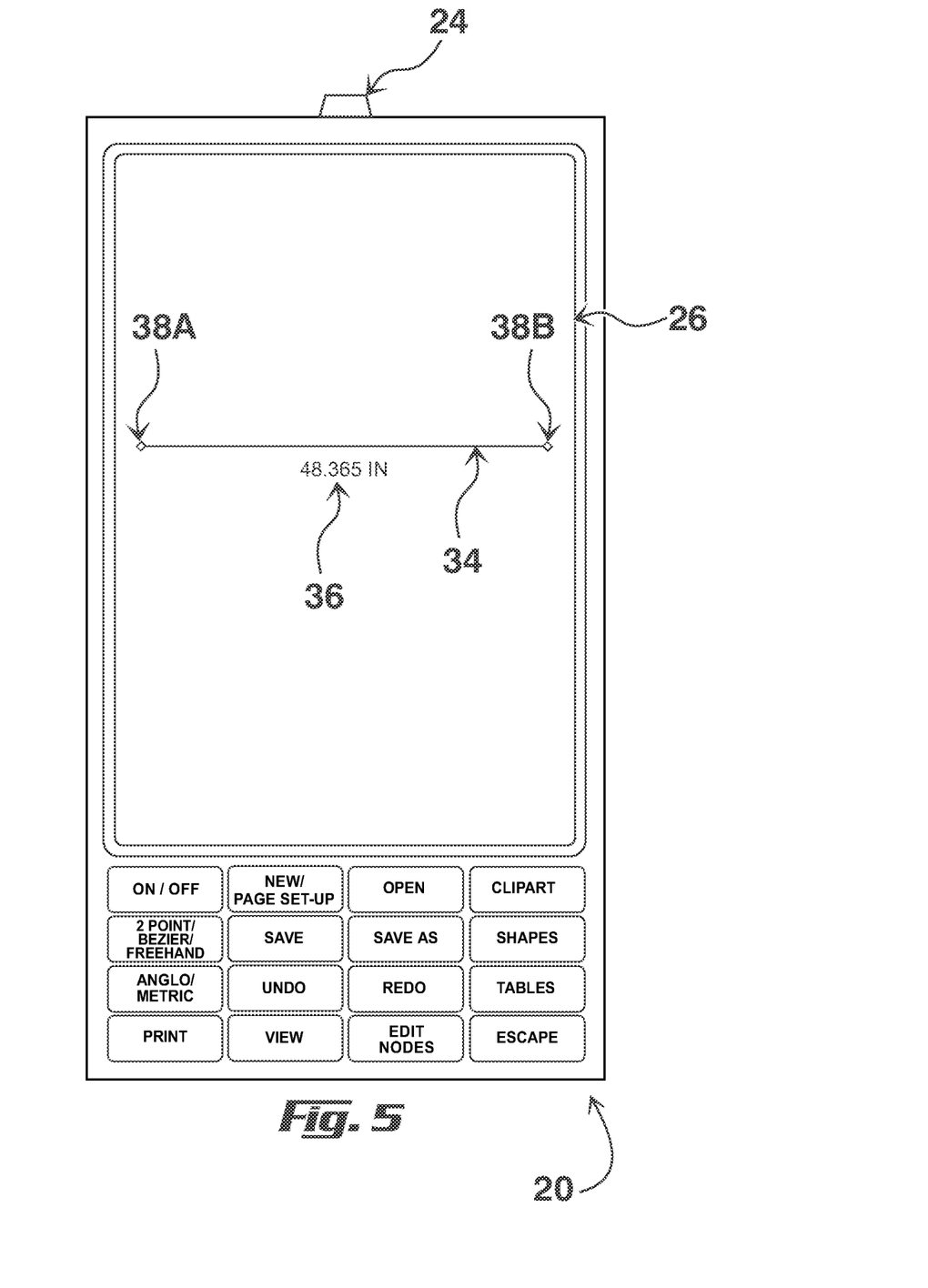
FIG. 5 is a plan view of an embodiment of the present invention showing a one dimensional measure of a line, and its reading, in numerical value.

A plan view of an embodiment of the present invention in FIG. 5 further depicts a one-dimensional line 34 produced by nodes 38A and 38B and visible on the monitoring screen 26 along the numerical length reading 36 of the one-dimensional line. A pointer 24 to emit light, laser beams, or other signals is also shown.

Figure 6:
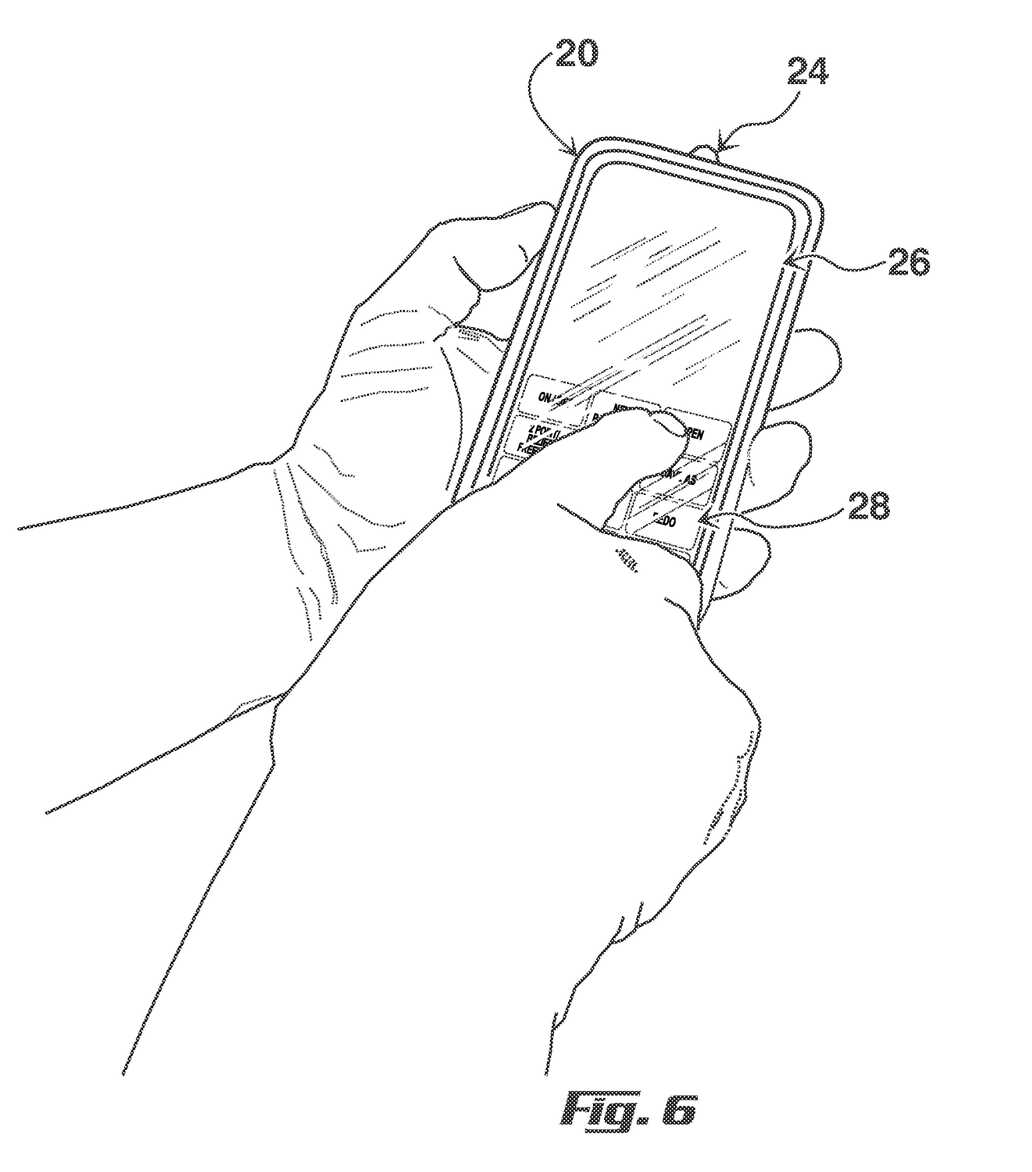
FIG. 6 is a perspective view of a mobile phone adapted to embody the present invention.

FIG. 6 shows an embodiment of the present invention adapted to a mobile phone, and such mobile phone having a touch sensitive screen 26, that enables display of commanding keys 28 and other features in the public domain (not shown). A pointer 24 to emit light beams is installed on the stereo of the phone. Alternatively, a tangible point and click mechanism or pointer may be installed on the phone (not shown)

Figure 7:
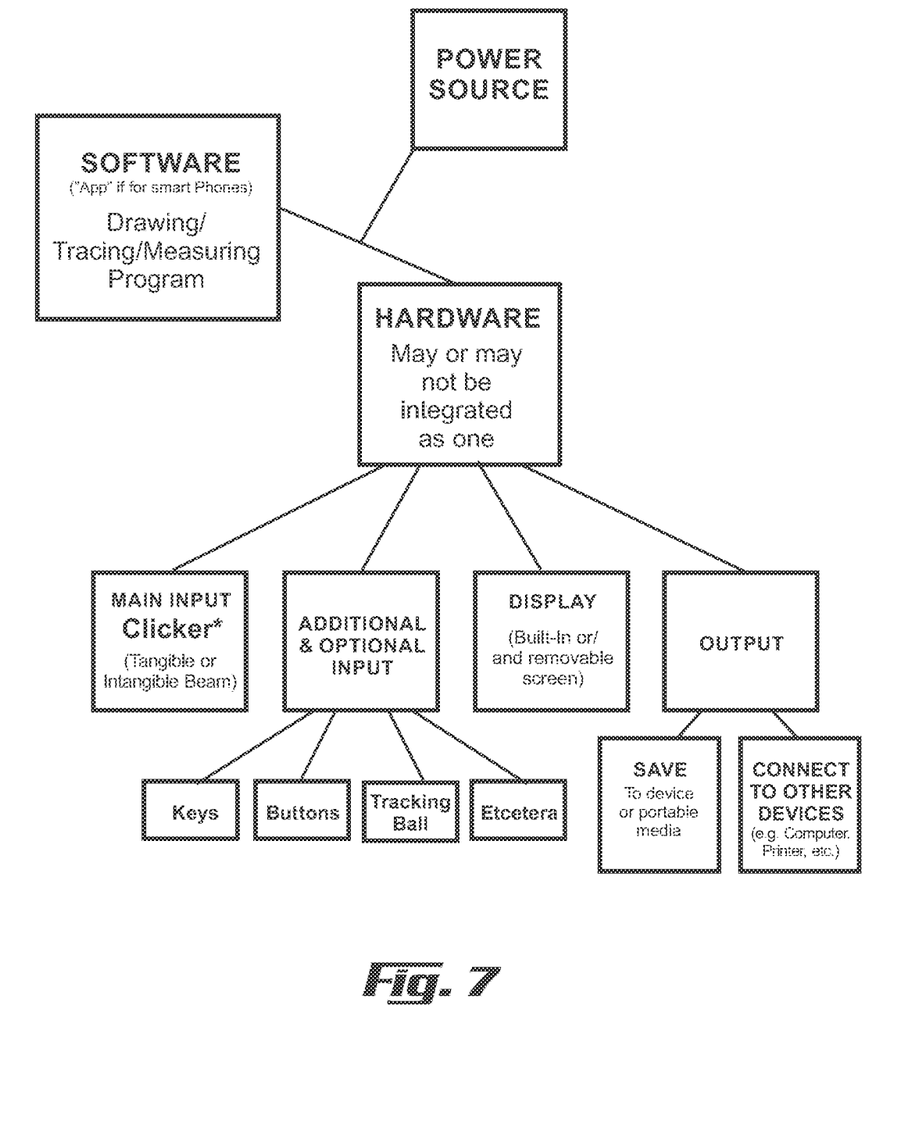
FIG. 7 is a block diagram of the present invention.

A block diagram of the conceptual parts and steps of the present invention is shown in FIG. 7.

Figure 8:
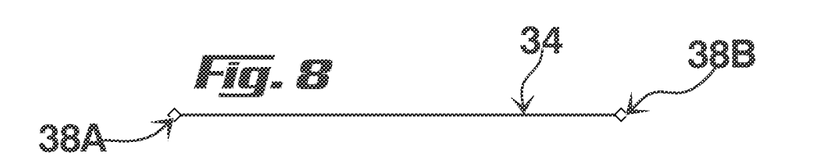
FIG. 8 is a depiction of a one dimensional line.

A one-dimensional line 34, starting at node 384 and finishing at node 38B is shown in FIG. 8. A 'Two-Point' tracing tool was used to trace line 34. Size of nodes was exaggerated in this drawing for enhanced visibility.

Figure 9:
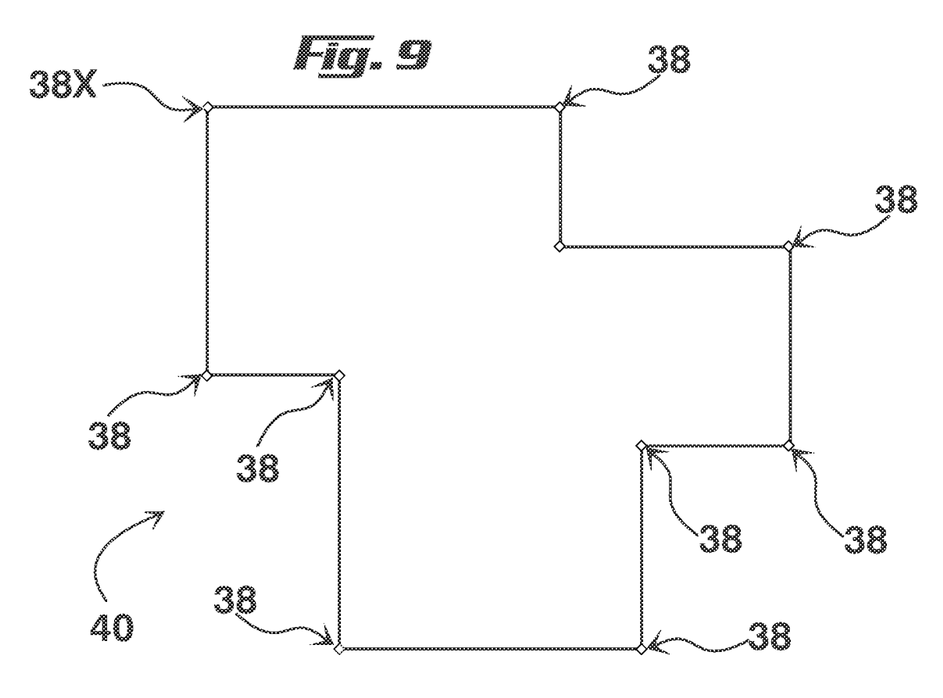
FIG. 9 is a depiction of a two dimensional shape.

FIG. 9, shows a two dimensional area. An initial and final click defines Node 38X. Nodes 38 were produced by a 'Bezier' tracing tool and indicate all pivotal points that define shape 40. Size of nodes was exaggerated to enhance visibility in the drawing.

Figure 10:
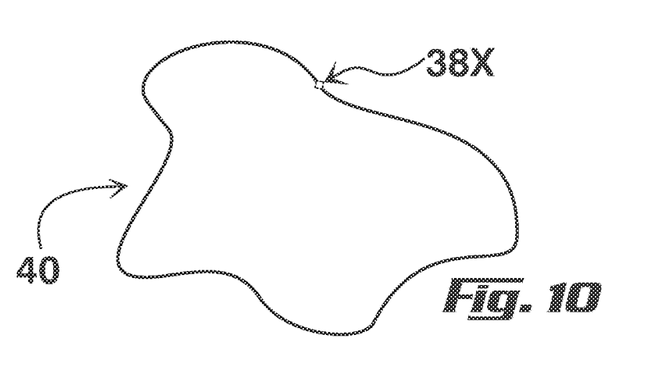
FIG. 10 is a depiction of a curvilinear two dimensional shape.

A curvilinear shape 40 was traced with a Freehand tool as shown in FIG. 10. Node 38X marks the beginning and the end of this curvilinear tracing. Again, the size of the node appears exaggerated for enhanced visibility.

Figure 11:
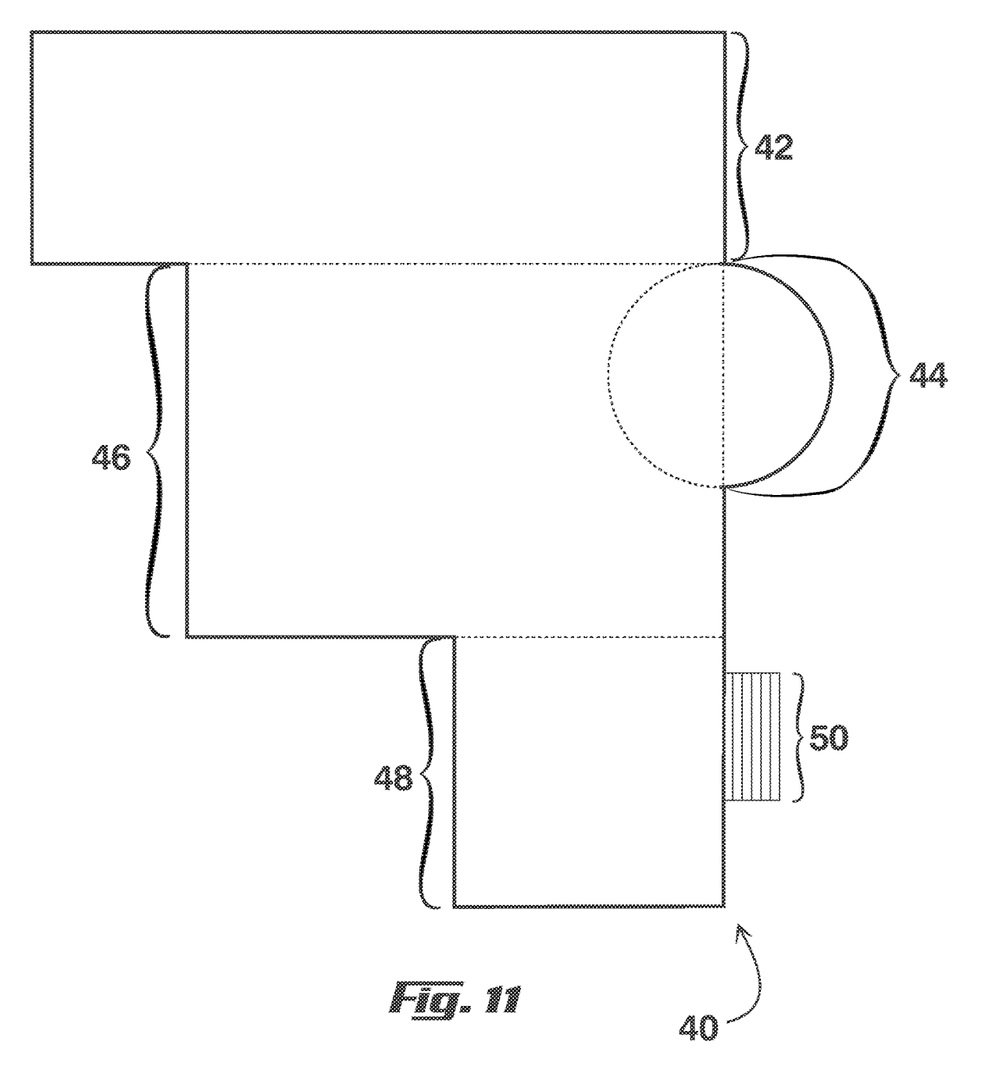
FIG. 11 is a plan view of a building lay-out comprised of several geometrical shapes.

The present invention enables segmentation of an irregular or complex area into separate geometrical shapes for calculations. As seen in FIG. 11, total area 40, is segmented into regional areas 42 (rectangle), 44 (semi-circle), 46 (rectangle), 48 (rectangle) and 50 (rectangle). Section 50, representing stairs may further be segmented onto the steps of the staircase, made up of 6 rectangles. The addition of all partial areas will result in the total general area 40.

Figure 12A:
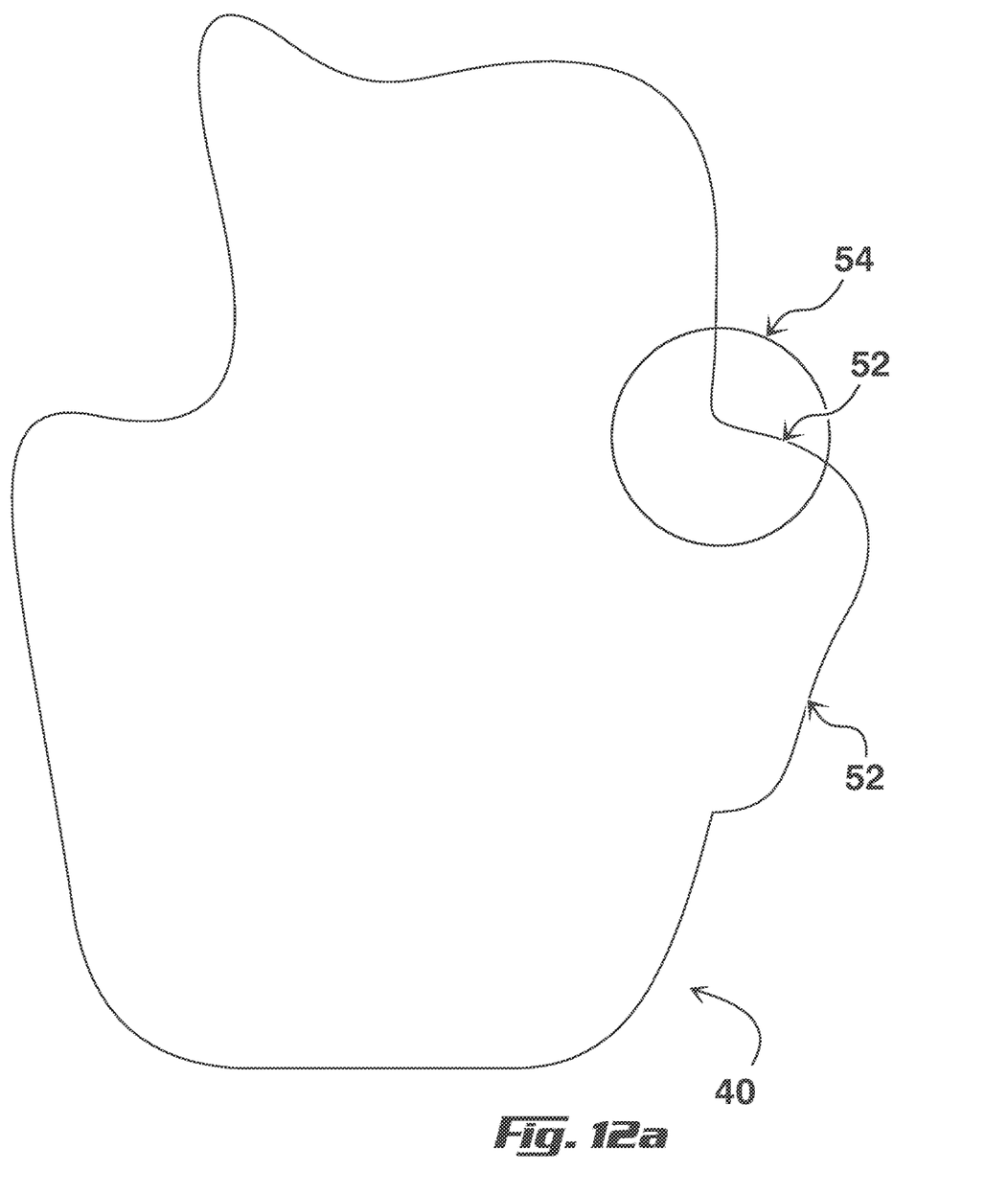
FIG. 12a is a plan view of a curvilinear shaped lay-out.
Figure 12B:
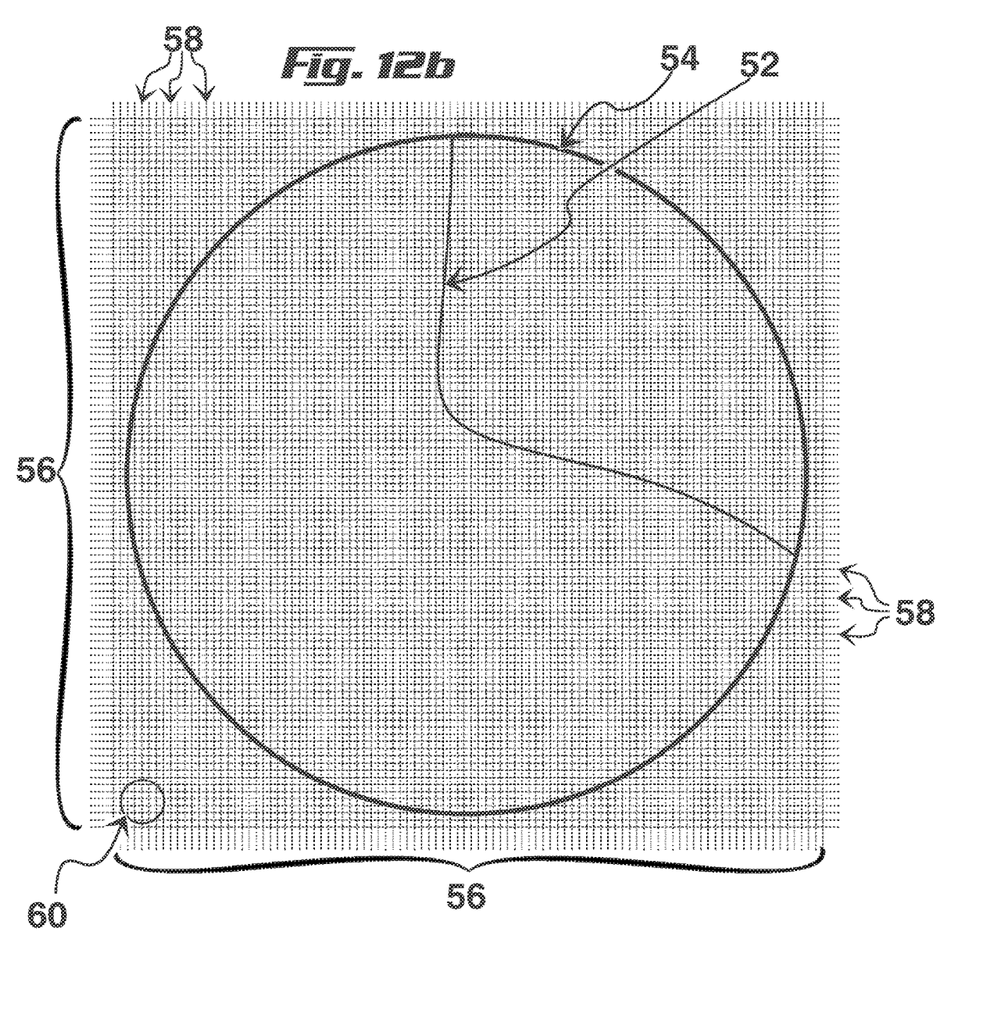
Figure 12C:
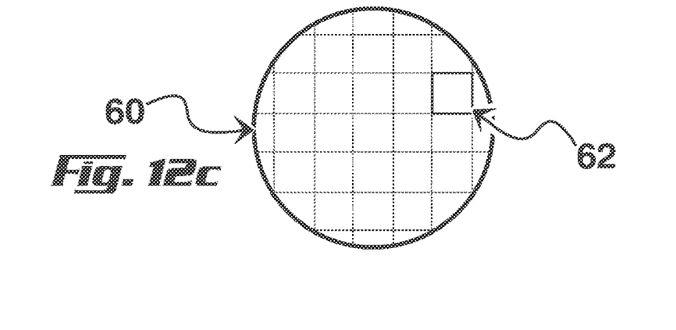
FIG. 12c is a magnified detail of a portion of FIG. 12b.

FIG. 12a depicts a curvilinear, asymmetrical area 40, having a perimeter 52. Circle 54 isolates a detail of area 40, shown in magnified detail in FIG. 12b. In FIG. 12b, coordinates 56 are comprised of lines 58, which define compartments or pixels, some of which are isolated by circle 60. FIG. 12c shows in a magnified detail circle 60 and a compartment or pixel unit 62. The calculation and addition of all compartments or pixels 62 within the perimeter 52 of area 40 enable a substantially accurate and precise measurement of area 40 in an unprecedented fashion.

Figure 13:
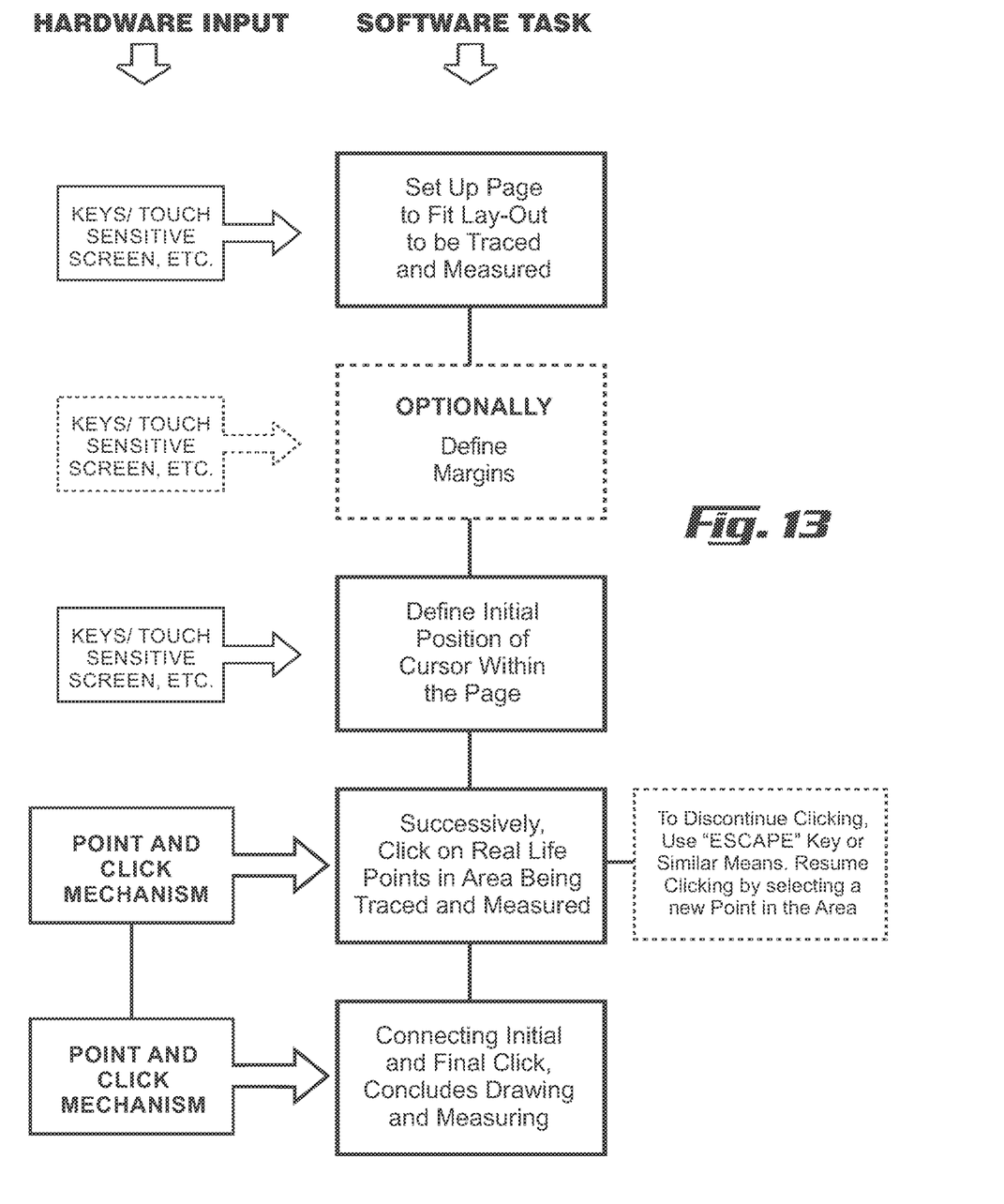
FIG. 13 is a block diagram of steps to use the present invention.

Block diagram of FIG. 13 represents a synopsis of the necessary steps to use the embodiment example of the present invention.

Figure 14A:
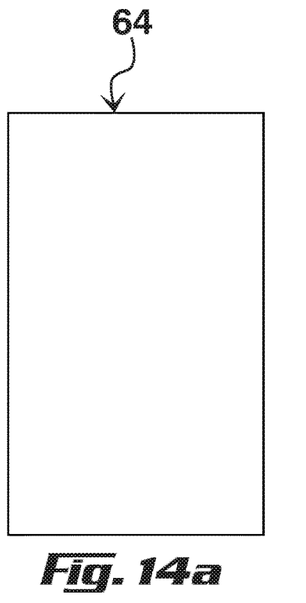
FIGS. 14a through FIG. 14f show in a progressive manner in plan view the page set up and subsequent steps to measure a two dimensional area.
Figure 14B:
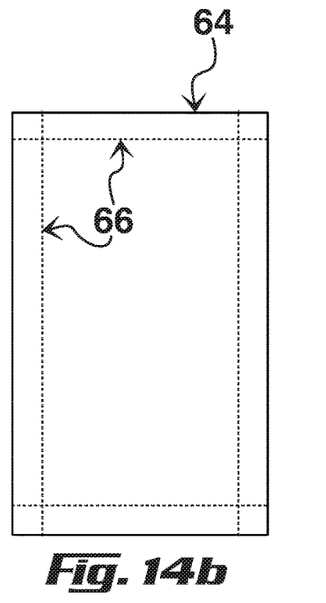
Figure 14C:
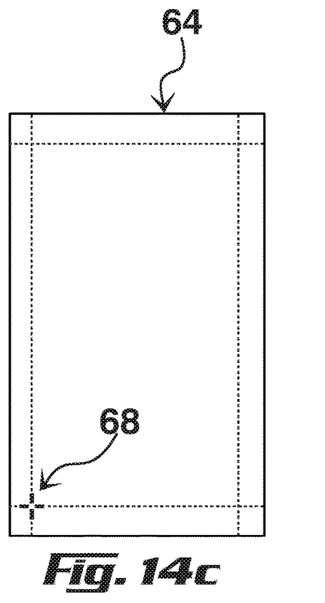

A progressive, step by step task of measuring and drawing a two dimensional area is shown in FIGS. 14a through 14f. Thus, FIG. 14a represents the assignment of a page having a selected size and shape 64 within the software of the present invention. Then, FIG. 14b shows the position of margins 66 on that page. While this is an optional step, in some embodiments these margins may be a part of the software. If, they are then undesirable for a particular project, they may be voided by positioning them on the edges of the page, or a "No-Margins" option may be provided. FIG. 14c shows the initial positioning of cursor 68.

Alternatively, in a simpler embodiment, the steps of defining and setting up a page may be obviated.

Figure 14D:
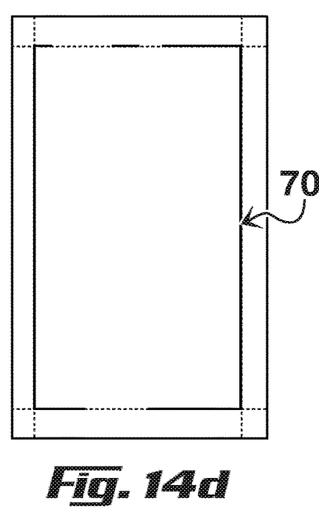
Figures 14E, 14F:
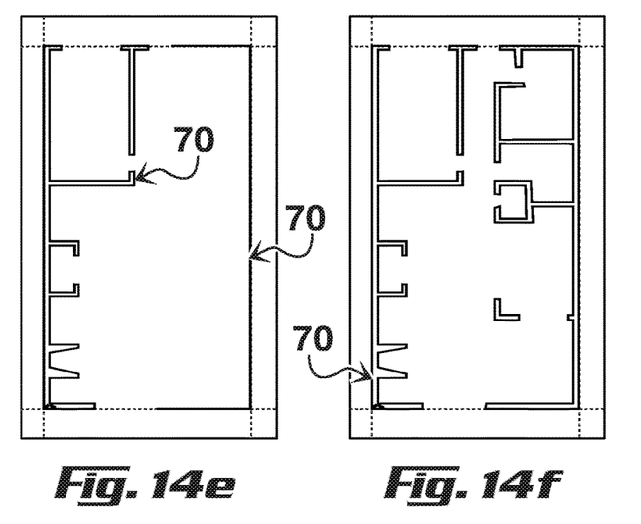

Initial tracings 70 are shown in FIG. 14d. A more advanced stage of tracings 70 is shown in FIG. 14e. FIG. 14f shows tracings 70 concluded, and the drawing of the desired lay-out fully executed.

When tracing must be discontinued to reflect an opening or a void space, a escape key may be depressed, or double clicking the clicker, or any other suitable system may be implemented for that purpose.

Partial and total dimensions may be displayed at all times, or may be selectively accessed by tracking keys, a built-in tracking ball, a touch pad, or touch screen mechanisms already in the public domain.

Figure 15:
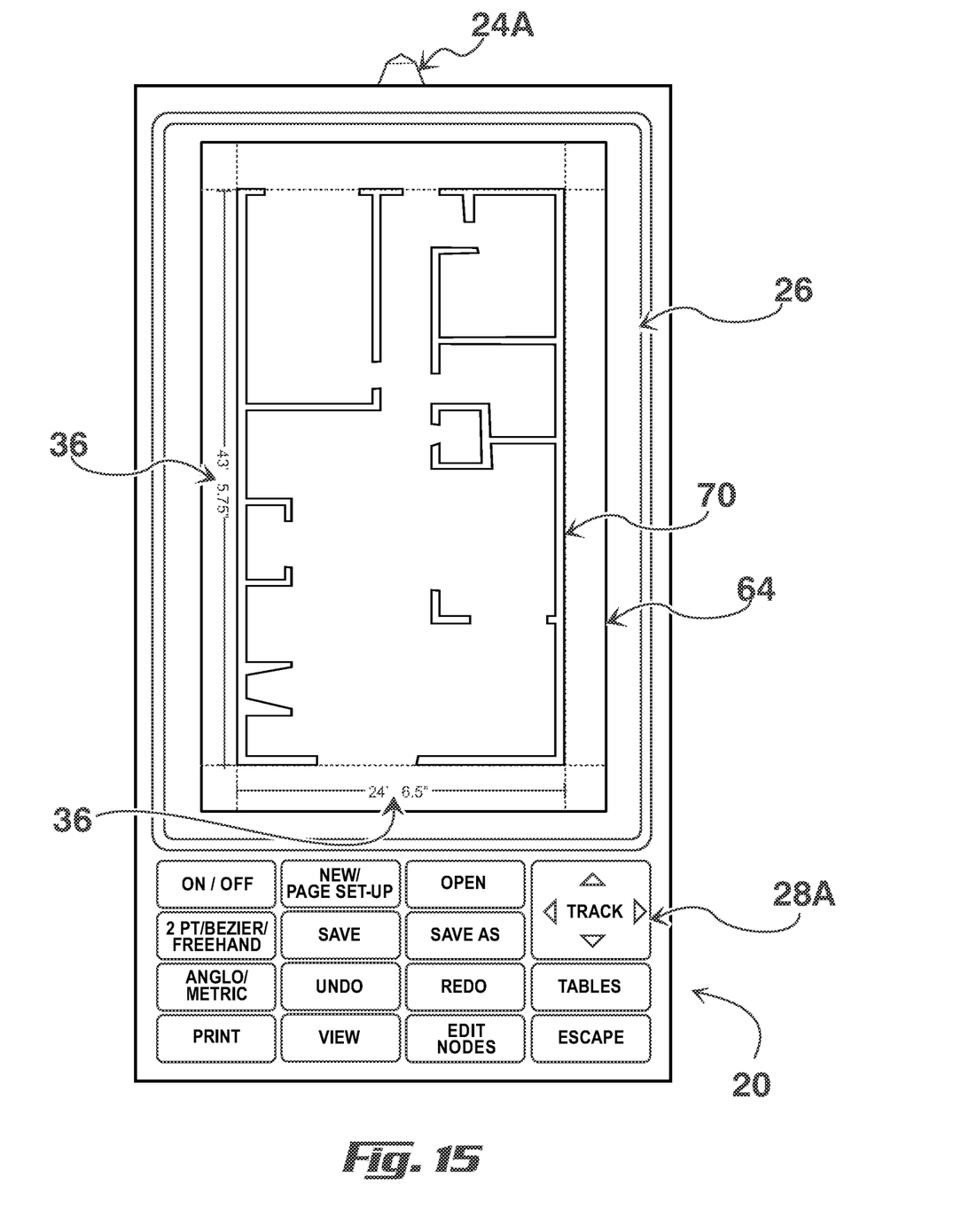
FIG. 15 shows in plan view an embodiment of the present invention displaying on the monitoring screen a layout traced and measured.

In FIG. 15 an embodiment of the present invention 20 is depicted. A fully traced lay-out 70 is shown within page 64 in screen 26. Additionally, tracking key 28A is shown. Tracking key 28A may be replaced by virtual means on a touch sensitive screen (not shown), or a tracking built-in ball or touch pad.

FIG. 15 also shows appendix 24A to emit light beams or signals, to act as pointer 24, and FIG. 15 also displays measurement readings 36.

I claim:

1. A point and click drawing and measuring device to draw and measure a predetermined objective, comprising:
   a) a power source,
   b) a central processing unit,
   c) pointing means, connected to said central processing unit to select at least two real world situation points, using a light or laser beam,
   d) clicking means, connected to said central processing unit to activate the selection of said at least two points,
   e) means to determine the exact location of said at least two points,
   f) a drawing software application,
      wherein said drawing software application keeps track of all distances of said at least two points, so as to render a proportional drawing of said predetermined objective,
   g) a viewing display unit connected to said central processing unit,
   whereby said device can be used to draw and measure said predetermined objective at a proportional scale, and be viewable on said viewing display unit.

2. The point and click drawing and measuring device of claim 1, wherein said predetermined objective is selected from the group consisting of movable and unmovable properties.

3. The point and click drawing and measuring device of claim 2, wherein said unmovable properties are land and buildings.

4. The point and click drawing and measuring device of claim 1, wherein said viewing display unit is touch sensitive and displays controlling keys to aid in the operation of said point and click drawing and measuring device.

5. The point and click drawing and measuring device of claim 1, wherein said point and click measuring and drawing device is embodied to operate within a gadget selected from a group consisting of portable tablets and mobile phones.

6. The point and click measuring and drawing device of claim 1, wherein said means to determine the exact location of said at least two points is selected from the group consisting of: Optical trackers, mechanical trackers, light beams, laser distance measurers, ultasonic distance measurers, global positioning systems, photogrammetry, triangulation, indoor positioning systems, electromagnetic locators, earth's magnetic field, high frequency radio waves, digital point finders, radar and surveying total stations.

7. The point and click measuring and drawing device of claim 1, wherein said drawing software allows to save all actions performed on a portable medium in the form of an electronic file.

8. The point and click drawing and measuring device of claim 1, wherein said predetermined objective has a two dimensional shape having an irregular configuration, wherein said irregular configuration is defined by a perimeter and is viewable on a proportional scale on said viewing display unit, wherein said drawing software reticulates said two dimensional shape into a plurality of units, wherein a size is assigned to each of said units, wherein said drawing and measuring software calculates the sum of all of said units within said perimeter, whereby the area of said two dimensional shape having an irregular configuration is calculated.

9. The point and click measuring and drawing device of claim 8, wherein said units are squares.

10. A point and click drawing and measuring device to draw and measure a predetermined objective, comprising:
   a) a power source,
   b) a central processing unit,
   c) a pointer, selected from the group consisting of tangible pointers and intangible pointers,
   d) clicking means, connected to said central processing unit to activate the selection of said at least two points,
   e) means to determine the exact location of said at least two points,
   f) a drawing software application,
      wherein said drawing software application keeps track of all distances of said at least two points, so as to render a proportional drawing of said predetermined objective,
   g) a viewing display unit connected to said central processing unit,
   wherein the tangible pointers include a laser beam or a light beam and the intangible pointers include a telescopic rod or a retractable rod;
whereby said device can be used to draw and measure said predetermined objective at a proportional scale, and be viewable on said viewing display unit.

11. The point and click drawing and measuring device of claim 9, wherein said drawing software application allows for subsequent editing.

12. An apparatus to measure and draw one dimensional and two dimensional areas in a real world situation, comprising:
   a) energy means,
   b) a motherboard,
   c) pointing means to select at least two points of said real life situation, connected to said motherboard,
   d) software to connect said at least two points of said one dimensional and two dimensional areas, and to keep track of all distances between said at least two points and sequentially connect said at least two points to render a proportional drawing,
   e) clicking means to activate the selection of said at least two points of said real life situation, connected to said motherboard,
   f) means to ascertain the location of said at least two points,
   g) a viewing display unit connected to said motherboard,
whereby said one dimensional and two dimensional areas in said real world situation, can be measured, drawn, and displayed on said viewing display unit.

13. The apparatus to measure and draw one dimensional and two dimensional areas in a real world situation of claim 12, wherein said pointing means is selected from the group consisting of light beams, laser beams, telescopic rods, and retractable rods.

14. The apparatus of claim 12, wherein said energy means is a battery.

15. The apparatus of claim 12, wherein said viewing display unit is touch sensitive and displays virtual controlling keys to aid in the operation of said apparatus.

16. The apparatus of claim 12, wherein said apparatus is embodied within a gadget selected from a group consisting of portable tablets and mobile phones.

17. The apparatus of claim 12, wherein said means to ascertain the location of said at least two points of clause f) is selected from the group consisting of: Optical trackers, mechanical trackers, light beams, laser distance measurers, ultasonic distance measurers, global positioning systems, photogrammetry, triangulation, indoor positioning systems, electromagnetic locators, earth's magnetic field, high frequency radio waves, digital point finders, radar and surveying total stations.

18. The apparatus of claim 12, wherein said two dimensional areas have a two dimensional shape having an irregular configuration,
   wherein said irregular configuration is defined by a perimeter and is viewable on a proportional scale on said viewing display unit,
   wherein said means to produce line drawings reticulates said two dimensional shape into a plurality of units,
   wherein a size is assigned to each of said units,
   wherein said means to produce line drawings of clause c) calculates the sum of all of said units within said perimeter,
   whereby the area of said two dimensional shape having an irregular configuration is calculated.

19. A method to electronically capture the dimensions of a real world setting, and to produce a graphic depiction of said real world setting, comprising the steps of:
   a) providing a portable computing mechanism,
   b) providing means to point to at least two points in said real world setting, connected to said portable computing mechanism, wherein said means is selected from the group consisting of a laser beam, a light beam, a telescopic rod and a retractable rod,
   c) providing means to identify the location of said at least two points in said real world setting, connected to said portable computing mechanism,
   d) providing means to select said at least two points in said real world scenario, connected to said portable computing mechanism,
   e) providing an electronic program to draw and measure said real world setting, by connecting said at least two points in said real world setting, as a proportional drawing,
   f) providing means to visually monitor said at least two points in said real world setting, connected to said portable computing mechanism,
whereby said dimensions of a real world setting are electronically captured, and a graphic depiction of said real world setting is produced.

20. The apparatus to measure and draw one dimensional and two dimensional areas in a real world situation of claim 19, wherein said means to point to at least two points in said real world setting is a digital pen.

21. The method of claim 19, wherein said means to identify the location of said at least two points is selected from the group consisting of: Optical trackers, mechanical trackers, light beams, laser distance measurers, ultasonic distance measurers, global positioning systems, photogrammetry, triangulation, indoor positioning systems, electromagnetic locators, earth's magnetic field, high frequency radio waves, digital point finders, radar and surveying total stations.

22. The method of claim 19, wherein said method is implemented to operate a gadget selected from a group consisting of portable tablets and mobile phones duly adapted to electronically capture the dimensions of a real world setting, and to produce a graphic depiction of said real world setting.

\* \* \* \* \*